Oct. 16, 1945.    J. H. OWENS    2,387,038
REFLECTOR
Filed Sept. 15, 1943
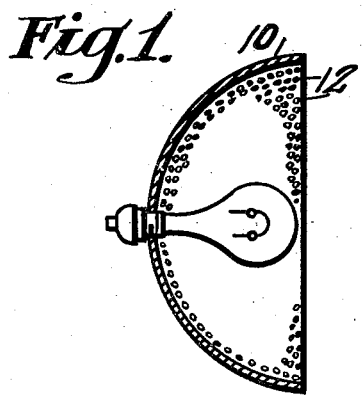
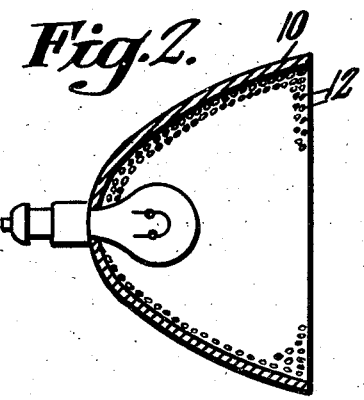
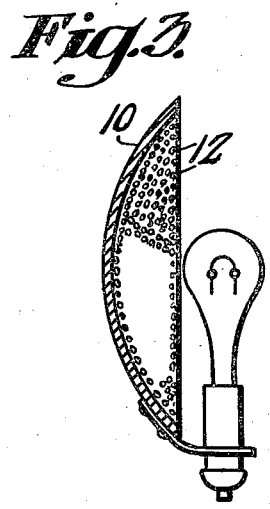
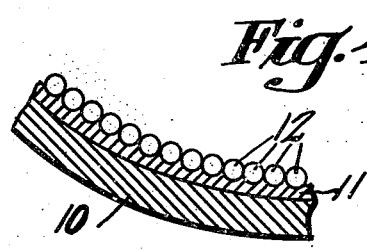
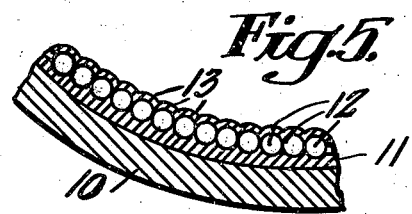
Inventor
James H. Owens
By
Attorney Patented Oct. 16, 1945

2,387,038

UNITED STATES PATENT OFFICE 2,387,038

REFLECTOR

James H. Owens, Camden, N. J., assignor to Radio Corporation of America, a corporation of Delaware Application September 15, 1943, Serial No. 502,426

1 Claim. (Cl. 88—105)

This invention involves a reflector of the type for reflecting light from a source to an object to be illuminated. In photography it is often necessary that the subject matter to be photographed be uniformly illuminated. In some cases the subject is illuminated from an angle or non-uniformly to produce a desired effect. Most reflectors for the purpose of photographic illumination are deficient in that the light on the subject is not uniform but falls off irregularly from the center of the illuminated spot to the margins. When two or more such illuminants are used together, the irregularity of the illumination of the subject is more pronounced. If reflectors are not used the effect of illumination by incandescent light or arc lights follows the square law but the loss of light is very great.

In the present invention a reflector of the spherical, parabolic or elliptical type is painted white and then covered with glass beads. Alternative constructions provide for a metallic reflector having small raised portions corresponding with the surface of the glass beads, the glass beads coated with a layer of reflective paint or a reflector of white material such as a white plastic or glass with its interior shaped in simulation of glass beads.

I have found that these types of reflectors greatly increase the uniformity of illumination on the subject and at the same time have a high reflecting power.

One object of the invention is to provide a reflector which will give a uniformly illuminated field from an incandescent light source.

Another object of the invention is to provide a reflection which will avoid too great a localized illumination or "hot spots."

Another object of the invention is to provide a process by which a reflector for photographic illumination can be repaired when it has become inefficient and after the repair have greatly improved efficiency.

In the drawing Figure 1 shows a hemispheric reflector of the beaded metal type with the socket type bulb attached to the middle of the reflector, Figure 2 shows a parabolic reflector with the interior surface beaded, Figure 3 shows a concave reflector with the lamp socket supported by a bracket in front of the reflector, Figure 4 shows a type of reflector with glass beads on the surface thereof, Figure 5 shows a type of reflector with glass beads embedded into the surface thereof and with a reflecting coating thereover, Figure 6 shows a reflector with bead formations pressed on the surface thereof, and Figure 7 shows a reflector formed from a sheet of material provided with raised protuberances resembling beads.

Referring first to Fig. 4, the base of the reflector 10 may be of metal, fibre, plastic or any convenient other material. If the reflector is to be used with high intensity lights such, for example, as photoflood lights, the base is preferably of metal. This base is coated with a layer of white paint 11, and while the paint is still tacky, glass beads 12 are pressed into the surface of the paint. These beads are preferably from 1/64th to 1/16th of an inch in diameter and are preferably of approximately uniform size. These beads serve as individual reflectors.

The process for converting conventional reflectors to glass beaded reflectors for producing new glass beaded reflectors is preferably as follows:

1. Prepare surface by caustic dip or other means to provide a bond for enamel.
2. Spray on a uniform coat of white-pigmented baking enamel.
3. Heat reflector to point where enamel becomes plastic.
4. Apply large amount of glass beads, and shake off excess.
5. Spray on a protective coating of clear lacquer.
6. Bake until all solvents are evaporated and enamel has set.

The glass beads do not tarnish or fade and they also serve to protect the paint layer from discoloration.

Another form of reflector is shown in Fig. 5 where the beads are covered with a layer of white paint. The reflecting characteristics of this surface are very similar to that of the form shown in Fig. 4 but the upper layer of paint is not protected from the elements by the beads. In this form of the invention the support 10 carries the layer of paint 11 having the beads 12 attached to the paint in a tacky condition as in Fig. 4 but a layer of paint 13 is applied after the beads are firmly secured to the support. This arrangement has the advantage that dirt does not get in between the beads and affect the reflecting characteristics, but it has the corresponding disadvantage that the paint is affected by the elements.

Fig. 6 shows a type of reflector made out of an appropriate plastic which is preferably white in color. This reflector may be pressed in an appropriate mold having a convex portion with small concave depressions over the surface so that when the article is finished there are a large number of small bead shaped surfaces on the interior of the reflector. This type of reflector may be made from white glass, porcelain either glazed or unglazed, or the more recent thermosetting plastics having included therein a white opacifier.

In the form of the invention shown in Fig. 7 a sheet of material 15 is formed so as to produce the bead-like convex portions 16 by pressing the material into an appropriate mold and pressing the concave depressions 17 where the bead-like convex portions are to appear on the interior of the reflector. This type of reflector may be made of metal, for example, aluminum, brass either silvered, nickeled or chromium plated, or a moldable plastic. The function of the raised convex surfaces 16 remains the same as the beads 12 or the raised convex surfaces 13 or 19. It will be apparent that in each form of the invention described, the reflector is broken up into a large number of individual reflectors which each operate as substantially point sources of light, giving a very uniform illumination.

When the ordinary metallic reflectors have become useless due to corrosion or wearing off of the reflecting film with which they are covered, they can be rendered usable by painting and beading their interior surface as above described and these reflectors will then attain a degree of reflection approximating that of new reflectors in addition to the uniformity of distribution of the light above described.

It will be apparent that my reflector is not limited to the hemispherical type or a parabolic or hyperbolic surface of revolution, but it may be semi-cylindrical or in a trough shape with a parabolic or hyperbolic or elliptical cross section. These latter types of reflectors are particularly adapted to long narrow lighting units.

My improved reflector is adapted not only to reflecting light onto objects to be illuminated, but it is equally well adapted to reflecting light in a photographic enlarger or for similar purposes.

I claim as my invention:

A reflector comprising a concave body having a layer of light reflecting material on its entire inner concave surface, a single layer comprising minute spherical glass beads of uniform size embedded in said reflecting layer and covering substantially said entire concave surface, and a transparent protective coating over said beads.

JAMES H. OWENS.